Jan. 17, 1961 J. F. McCAULEY 2,968,281
FEEDING AND WATERING DEVICES FOR BIRD CAGES
Filed Aug. 19, 1959
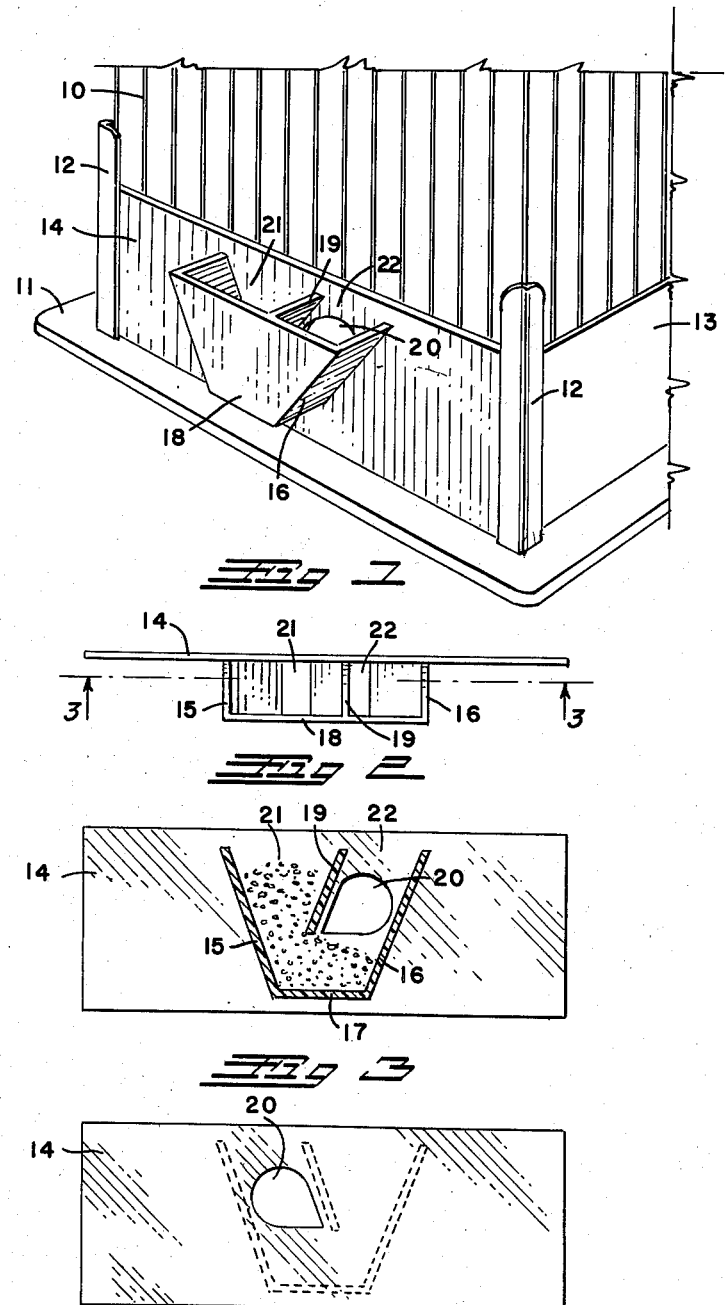
INVENTOR.
JAMES F. McCAULEY
BY
ATTORNEY

United States Patent Office 2,968,281
Patented Jan. 17, 1961

2,968,281

FEEDING AND WATERING DEVICES FOR BIRD CAGES

James F. McCauley, 1213 Clarkson St., Denver, Colo.

Filed Aug. 19, 1959, Ser. No. 834,871

1 Claim. (Cl. 119—18)

This invention relates to a device to be applied to a bird cage for supplying food or water to the birds therein and has for its principal object the provision of economical, attractive, and highly efficient devices which can be quickly and easily slipped into position on a conventional cage to provide a constantly replenished supply of food and water for the feathered occupants of the cage.

Another object of the invention is to provide a bird feeding device which will be replaceable with the transparent plastic splash guards of a conventional cage and which will eliminate the scattering of food and hulls in and about the cage and to so construct the device that hulls and refuse accumulated therein can be instantly blown therefrom without removing the device from the cage.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a fragmentary perspective view illustrating the lower portion of one extremity of a conventional bird cage with the invention applied thereto;

Fig. 2 is a top view of the improved bird cage feeding and watering device;

Fig. 3 is a longitudinal section therethrough taken on the line 3—3, Fig. 2; and Fig. 4 is an inside elevational view of the device.

In Fig. 1, a conventional bird cage has been indicated at 10 with its floor at 11. Present day cages are provided with upstanding corner members 12 of various designs. The corner members 12 are positioned externally at the corners of the cage for supporting retaining guard plates 13 about the base of the cage to prevent the scattering of refuse. This invention is designed to be slipped in place between two of the corner members 12 to replace the conventional guard plates. Two of the devices are preferably used on each cage, one for water and one for seed or other food, and are preferably positioned at opposite ends of the cage in place of the guard plates at the ends. The latter opposite ends are usually provided with openings for receiving feed and water cups.

The devices comprise a back plate 14 corresponding in height to the usual guard plate 13 and having a length sufficient to extend between and be held in place by the retaining corner members 12, as shown in Fig. 1. The back plate 14 is preferably formed from a suitable rigid transparent moldable plastic.

A substantially V-shaped box is molded integrally with or otherwise secured on the outer face of the back plate 14. The box comprises two, inwardly inclined side walls 15 and 16, a substantially horizontal bottom wall 17, and a front wall 18. A partition plate 19 extends downwardly into the box in parallel spaced relation to the side wall 16. The upper extremity of the partition plate 19 terminates in the plane of the upper extremities of the side walls 15 and 16 and the lower extremity of the partition plate 19 terminates in spaced relation to the bottom wall 17. An open window 20 is formed through the back plate 14 between the side wall 16 and the partition plate 19 and above the lower extremity of the partition plate 19.

The above structure forms a reservoir compartment 21 and a feeding compartment 22. The reservoir compartment 21 can be completely filled with seed or other granular food and the latter will gradually flow beneath the partition plate 19 into the bottom of the feeding compartment 22 to replace seed removed from the latter. Excess seed and hulls can be removed at intervals by simply blowing into the top of the feeding compartment 22 to blow the hulls through the window 20 and into the cage so as to uncover the seeds and yet retain the hulls in the cage to prevent scattering. If the device is used for watering, the water simply replaces the seed therein. The devices are placed on the cage by simply dropping them into place between the corner members 12 and over the conventional feed and water openings in the cage so that the plates 14 rest upon the cage floor 11.

While a specific form of the improvement has been described and illustrated herein, it is to be understood that the same may be varied within the scope of the appended claim, without departing from the spirit of the invention.

Having thus described the invention what is claimed and desired secured by Letters Patent is:

A feeding device to replace a conventional splash guard on a bird cage comprising: a flat back plate; means for securing said back plate vertically and externally against a side of said cage; an imperforate front wall member positioned in parallel spaced relation to said back plate and having a relatively wide horizontal upper edge and a relatively narrow horizontal lower edge and two side edges which incline uniformly inward toward each other as said bottom edge is approached; two imperforate side walls joining the side edges of said front wall member to said back plate; a bottom wall joining the lower edge of said front wall member to said back plate and joining the lower extremities of said side walls to form a relatively flat, truncated-V-shaped, open-topped box; a partition plate joined to and extending between said front wall member and said back plate between said side plates and extending downwardly in substantially parallel relation to one of said side plates to form an open-topped, inclined feeding compartment of uniform width and an open-topped, hopper-shaped reservoir compartment, said partition plate terminating above said bottom plate to provide communication between the bottom portions of said compartments; and an open window formed through said back plate into said feeding compartment.

References Cited in the file of this patent

UNITED STATES PATENTS

| | | |
|---|---|---|
| 2,195,575 | Mallgraf | Apr. 2, 1940 |
| 2,388,157 | Kerr | Oct. 30, 1945 |